(12) United States Patent
Jackson

(10) Patent No.: US 8,806,492 B2
(45) Date of Patent: *Aug. 12, 2014

(54) SYSTEM AND METHOD OF INTERFACING A WORKLOAD MANAGER AND SCHEDULER WITH AN IDENTITY MANAGER

(75) Inventor: David Brian Jackson, Spanish Fork, UT (US)

(73) Assignee: Adaptive Computing Enterprises, Inc., Provo, UT (US)

( * ) Notice: Subject to any disclaimer, the term of this patent is extended or adjusted under 35 U.S.C. 154(b) by 210 days.

This patent is subject to a terminal disclaimer.

(21) Appl. No.: 13/466,499

(22) Filed: May 8, 2012

(65) Prior Publication Data
US 2012/0227054 A1 Sep. 6, 2012

Related U.S. Application Data

(63) Continuation of application No. 11/207,438, filed on Aug. 19, 2005, now Pat. No. 8,176,490.

(60) Provisional application No. 60/603,296, filed on Aug. 20, 2004.

(51) Int. Cl.
*G06F 9/46* (2006.01)
*G06F 9/48* (2006.01)
*G06F 9/50* (2006.01)
*G06F 9/445* (2006.01)

(52) U.S. Cl.
CPC ............ *G06F 9/4881* (2013.01); *G06F 9/5072* (2013.01); *G06F 9/44552* (2013.01)
USPC .......................................... 718/100; 718/104

(58) Field of Classification Search
CPC .. G06F 9/4881; G06F 9/5072; G06F 9/44552

USPC .......................................... 718/100, 102, 104
See application file for complete search history.

(56) References Cited

U.S. PATENT DOCUMENTS

| | | | |
|---|---|---|---|
| 6,202,080 | B1 | 3/2001 | Lu et al. |
| 6,366,945 | B1 | 4/2002 | Fong et al. |
| 6,466,965 | B1 | 10/2002 | Chessell et al. |
| 6,816,905 | B1 | 11/2004 | Sheets et al. |
| 7,526,479 | B2 | 4/2009 | Zenz |

(Continued)

FOREIGN PATENT DOCUMENTS

| | | |
|---|---|---|
| WO | WO 01/14987 | 3/2001 |
| WO | WO 2005/017783 | 2/2005 |

OTHER PUBLICATIONS

Furmento et al. "An Integrated Grid Environment for Component Applications", Proceedings of the 2nd International Workshop on Grid Computing table of contents, 2001, pp. 26-37.*

*Primary Examiner* — Emerson Puente
*Assistant Examiner* — Willy W Huaracha

(57) ABSTRACT

A system, method and computer-readable media for managing a compute environment are disclosed. The method includes importing identity information from an identity manager into a module performs workload management and scheduling for a compute environment and, unless a conflict exists, modifying the behavior of the workload management and scheduling module to incorporate the imported identity information such that access to and use of the compute environment occurs according to the imported identity information. The compute environment may be a cluster or a grid wherein multiple compute environments communicate with multiple identity managers.

18 Claims, 3 Drawing Sheets

(56) References Cited

U.S. PATENT DOCUMENTS

| | | |
|---|---|---|
| 8,631,130 B2 * | 1/2014 | Jackson .................. 709/226 |
| 2002/0120741 A1 | 8/2002 | Webb et al. |
| 2005/0069099 A1 | 3/2005 | Kozdon et al. |
| 2005/0071271 A1 | 3/2005 | Hettish |
| 2005/0165925 A1 | 7/2005 | Dan et al. |
| 2005/0278441 A1 * | 12/2005 | Bond et al. ................ 709/223 |
| 2005/0278760 A1 | 12/2005 | Dewar et al. |
| 2006/0230149 A1 | 10/2006 | Jackson |
| 2009/0300152 A1 * | 12/2009 | Ferris ..................... 709/223 |
| 2011/0296029 A1 * | 12/2011 | Jackson .................. 709/226 |
| 2014/0052866 A1 * | 2/2014 | Jackson .................. 709/226 |

* cited by examiner

SYSTEM AND METHOD OF INTERFACING A WORKLOAD MANAGER AND SCHEDULER WITH AN IDENTITY MANAGER

PRIORITY CLAIM

The present application is a continuation of U.S. patent application Ser. No. 11/207,438, filed Aug. 19, 2005, now U.S. Pat. No. 8,176,490, which claims priority to U.S. Provisional Application No. 60/603,296 filed Aug. 20, 2004, the contents of which are incorporated herein by reference.

BACKGROUND

1. Field of the Disclosure

The present disclosure relates to managing workload and scheduling in a compute environment such as a cluster or grid and more specifically to a system and method of providing an interface between a workload management and scheduling module for a compute environment and an identity manager.

2. Introduction

The present disclosure relates to a system and method of allocation resources in the context of a grid or cluster of computers. Grid computing may be defined as coordinated resource sharing and problem solving in dynamic, multi-institutional collaborations. Many computing projects require much more computational power and resources than a single computer or single processor may provide. Networked computers with peripheral resources such as printers, scanners, I/O devices, storage disks, scientific devices and instruments, etc. may need to be coordinated and utilized to complete a task or a job.

Grid/cluster resource management generally describes the process of identifying requirements, matching resources to applications, allocating those resources, and scheduling and monitoring compute resources over time in order to run applications and workload as efficiently as possible. Each project will utilize a different set of resources and thus is typically unique. In addition to the challenge of allocating resources for a particular job, administrators also have difficulty obtaining a clear understanding of the resources available, the current status of the compute environment and real-time competing needs of various users. One aspect of this process is the ability to reserve resources for a job. A workload manager will seek to reserve a set of resources to enable the compute environment to process a job at a promised quality of service. One example of workload management software is the various compute environment management software available from Cluster Resources, Inc., such as the Moab™ Workload Manager, Moab™ Cluster Manager, the Moab™ Grid Suite and the Moab™ Cluster Suite.

General background information on clusters and grids may be found in several publications. See, e.g., Grid Resource Management, State of the Art and Future Trends, Jarek Nabrzyski, Jennifer M. Schopf, and Jan Weglarz, Kluwer Academic Publishers, 2004; and Beowulf Cluster Computing with Linux, edited by William Gropp, Ewing Lusk, and Thomas Sterling, Massachusetts Institute of Technology, 2003.

It is generally understood herein that the terms grid and cluster are interchangeable in that there is no specific definition of either. In general, a grid will include a plurality of clusters as will be shown in FIG. 1A. Several general challenges exist when attempting to maximize resources in a grid. First, there are typically multiple layers of grid and cluster schedulers. A grid 100 generally includes a group of clusters or a group of networked computers. The definition of a grid is very flexible and may mean a number of different configurations of computers. The definition may depend on how a compute environment is administered and controlled via local control (clusters) or global control/administration (grids). The introduction here is meant to be general given the variety of configurations that are possible.

A grid scheduler 102 communicates with a plurality of cluster schedulers 104A, 104B and 104C. Each of these cluster schedulers communicates with a respective resource manager 106A, 106B or 106C. Each resource manager communicates with a respective series of compute resources shown as nodes 108A, 108B, 108C in cluster 110, nodes 108D, 108E, 108F in cluster 112 and nodes 108G, 108H, 108I in cluster 114.

Local schedulers (which may refer to either the cluster schedulers 104 or the resource managers 106) are closer to the specific resources 108 and may not allow grid schedulers 102 direct access to the resources. Examples of compute resources include data storage devices such as hard drives and computer processors. The grid level scheduler 102 typically does not own or control the actual resources. Therefore, jobs are submitted from the high level grid-scheduler 102 to a local set of resources with no more permissions that then user would have. This reduces efficiencies and can render the reservation process more difficult. When jobs are submitted from a grid level scheduler 102, there is access information about the person, group or entity submitting the job. For example, the identity of the person submitting the job may have associated with him or her a group of restrictions but also guarantees of service, such as a guarantee that 64 processors will be available within 1 hour of a job submission.

The heterogeneous nature of the shared resources also causes a reduction in efficiency. Without dedicated access to a resource, the grid level scheduler 102 is challenged with the high degree of variance and unpredictability in the capacity of the resources available for use. Most resources are shared among users and projects and each project varies from the other. The performance goals for projects differ. Grid resources are used to improve performance of an application but the resource owners and users have different performance goals: from optimizing the performance for a single application to getting the best system throughput or minimizing response time. Local policies may also play a role in performance.

Within a given cluster, there is only a concept of resource management in space. An administrator can partition a cluster and identify a set of resources to be dedicated to a particular purpose and another set of resources can be dedicated to another purpose. In this regard, the resources are reserved in advance to process the job. By being constrained in space, the nodes 108A, 108B, 108C, if they need maintenance or for administrators to perform work or provisioning on the nodes, have to be taken out of the system, fragmented permanently or partitioned permanently for special purposes or policies. If the administrator wants to dedicate them to particular users, organizations or groups, the prior art method of resource management in space causes too much management overhead requiring a constant adjustment the configuration of the cluster environment and also losses in efficiency with the fragmentation associated with meeting particular policies.

Reservations of compute resources were introduced above. To manage the jobs submissions, a cluster scheduler will employ reservations to insure that jobs will have the resources necessary for processing. FIG. 1B illustrates a cluster/node diagram for a cluster 110 with nodes 120. Time is along the X axis. An access control list (ACL) 114 to the cluster is static, meaning that the ACL is based on the credentials of the person, group, account, class or quality of service making the request or job submission to the cluster. The ACL 114 determines what jobs get assigned to the cluster 110 via a reservation 112 shown as spanning into two nodes of the cluster. Either the job can be allocated to the cluster or it can't and the decision is determined based on who submits the job at submission time. Further, in environments where there are multiple clusters associated with a grid and workload is transferred around the grid, there is a continual difficulty of managing restrictions and guarantees associated with each entity that can submit jobs. Each cluster will have constant alterations made to users and groups as well as modifications of the respective compute environment. Currently, there is no mechanism to insure that up-to-date identity information for a particular user where workload submitted by that user may be transferred to an on-demand site or to a remote cluster from the submitter's local environment.

One deficiency with the prior approach is that there are situations in which organizations would like to make resources available but only in such a way as to balance or meet certain performance goals. Particularly, groups may want to establish a constant expansion factor and make that available to all users or they may want to make a certain subset of users that are key people in an organization and give them special services when their response time drops below a certain threshold. Given the prior art model, companies are unable to have the flexibility over their cluster resources. Further, given the complexity of the interaction between various compute environments, it becomes difficult to insure that the priority identity information associated with the key people will be enforced if workload from those individuals is transferred to another compute environment for processing.

As mentioned above, a challenge in the cluster and grid computing environment relates to management of non-local user credentials for workload. For example, as on-demand computing centers come on-line that enable a cluster or a grid to send jobs or workload in an overflow capacity to the on-demand center, there are situations where non-local users and groups have specific credentials that define constraints on each person or group's rights and limits to use of the compute resources. This may occur, for example, where workload may flow into a compute environment that has non-local user jobs. Where a cluster or one compute environment may communicate with an on-demand center, or a cluster communicating with another cluster, and so forth, there are difficulties in managing and maintaining the constraints on each user's credentials (whether the user is local or non-local) for accessing the local compute environment.

To improve the management of compute resources, what is needed in the art is a system and method for a workload management and scheduling module to manage access to the compute environment according to local and non-local user credentials as the module interacts with other modules and other outside entities.

SUMMARY

Additional features and advantages of the disclosure will be set forth in the description which follows, and in part will be obvious from the description, or may be learned by practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth herein.

The disclosure addresses the need to manage user credentials as a local compute environment interacts with outside entities such as an identity manager. The disclosure includes a system, method and computer-readable medium that manage a compute environment. The method embodiment includes importing identity information from an identity manager into a module that performs workload management and scheduling for a compute environment and unless a conflict exists, modifying the behavior of the workload management and scheduling module to incorporate the imported identity information such that access to and use of the compute environment occurs according to the imported identity information. The identity manager may be a file, a database, or a service that is a centralized and coordinated database of identity information, such as users, groups, accounts, qualities of service, and classes.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION

Figure 1A:
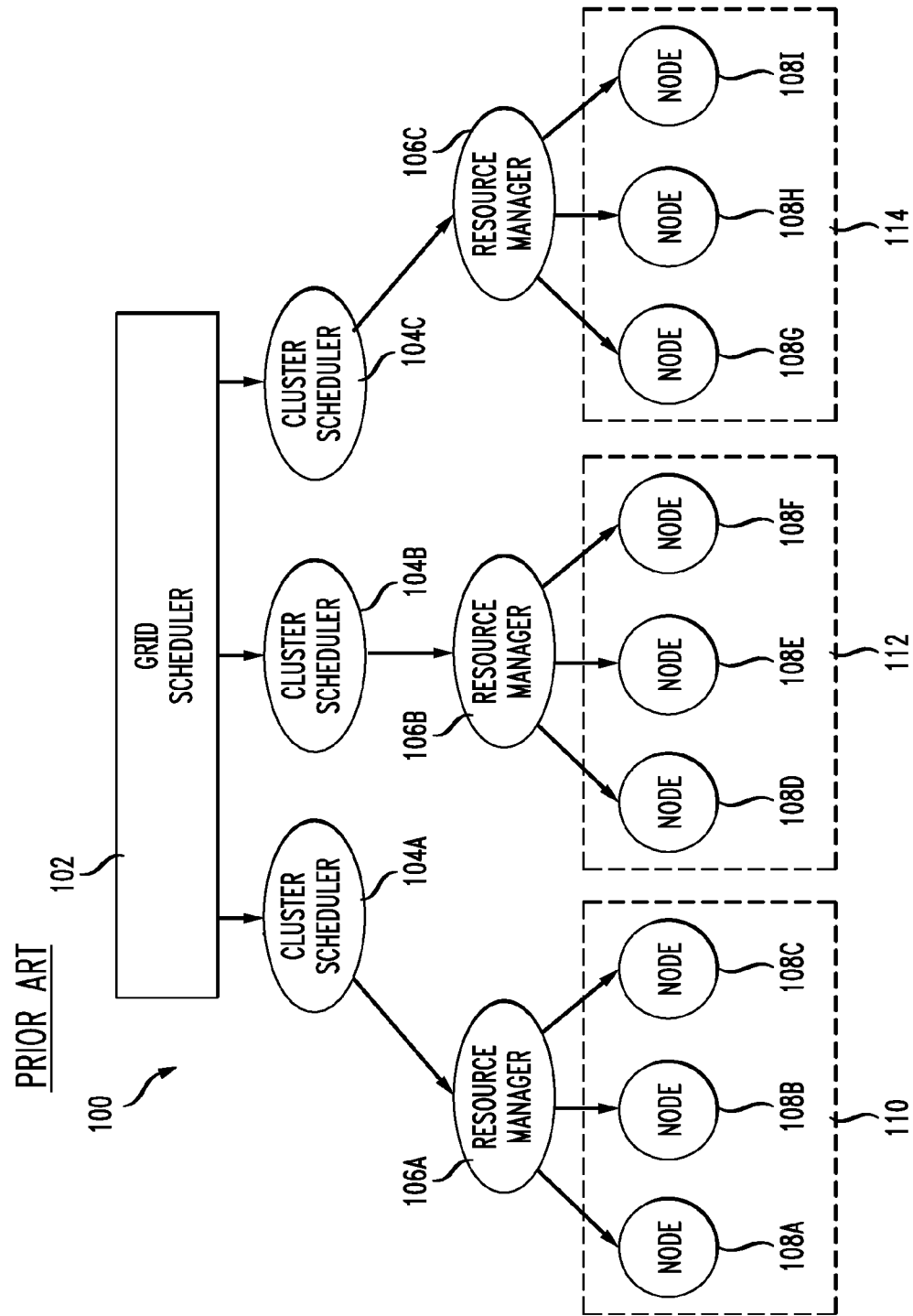
FIG. 1A illustrates generally a grid scheduler, cluster scheduler, and resource managers interacting with compute nodes.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure relates to resource reservations in the context of a compute environment. The environment may be operated by a hosting facility, on-demand center, hosting center, a virtual hosting center, data center, grid, cluster and/or utility-based computing environments. The system aspect of the disclosure includes a computing device that operates software that practices the steps of the disclosure to manage compute resources. There are many known types of computing devices that are known to those of skill in the art and that are acceptable as the system embodiment of the disclosure. The computing device may be a single device or a plurality of connected computing devices that enable the disclosure to be practiced.

For a user or an administrator, a graphical user interface is presented for interacting with the workload management software. It is also contemplated that the system may include features such as multi-modal interfaces for ease of interaction and control of the compute environment. For example, the graphical user interface may utilize natural language dialog, touch-screen input, motion detection input, gesture input, mouse input or a combination of these types of input to enable improved efficiency for users and administrators of the compute environment. These are discussed more below.

The software operating within the system is included of computer program modules written in a computing language, such as the C programming language or any other suitable programming language. The programming modules include all the necessary programming to communicate with the compute environment (i.e., such as the cluster/grid) and both receive information about the compute resources within the compute environment and also manage the reservation and use of those compute resources.

The primary aspect of the disclosure included herein relates to the concept of managing the interface between a compute environment (or the software that manages the workload and scheduling of a compute environment) and an external identity manager that maintains a centralized database of identity information for users, groups and other entities. Therefore, the system embodiment of the disclosure will include the various modules that practice the steps of the method embodiment of the disclosure included herein. For example, a system for managing compute resources within a compute environment may include means for importing identity information from an identity manager into a module that performs workload management and scheduling for the compute environment and means for, unless a conflict exists, modifying the behavior of the module to incorporate the imported identity information such that access to and use of the compute environment occurs according to the imported identity information. The means for performing this may be, as mentioned above, computer programmed modules within a software package that perform these steps on a computing device(s). The workload management and scheduling module may include, at least one of a resource manager, a grid manager, a cluster scheduler, a cluster workload manager or a grid workload manager.

Figure 2:
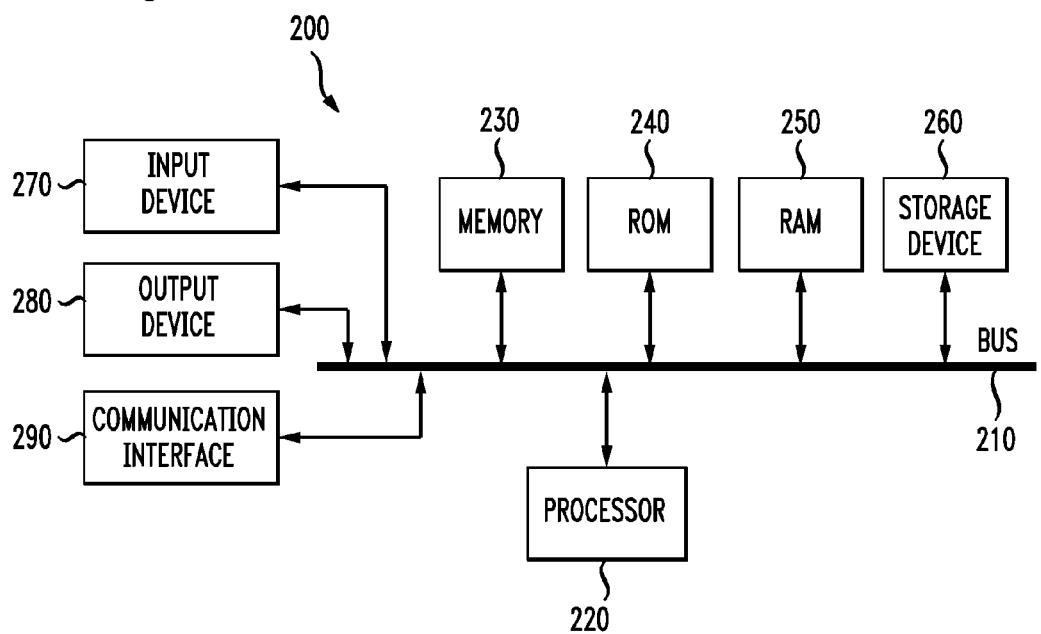
FIG. 2 illustrates an exemplary system according to an aspect of the disclosure.

FIG. 2 and the related discussion are intended to provide a brief, general description of a suitable computing environment in which the disclosure may be implemented. Although not required, the disclosure will be described, at least in part, in the general context of computer-executable instructions, such as program modules, being executed by a personal computer. Generally, program modules include routine programs, objects, components, data structures, etc. that perform particular tasks or implement particular abstract data types. Moreover, those skilled in the art will appreciate that the disclosure may be practiced with other computer system configurations, including hand-held devices, multiprocessor systems, microprocessor-based or programmable consumer electronics, network PCs, minicomputers, mainframe computers, and the like. The disclosure may also be practiced in distributed computing environments where tasks are performed by remote processing devices that are linked through a communications network. In a distributed computing environment, program modules may be located in both local and remote memory storage devices.

With reference to FIG. 2, an exemplary system for implementing the disclosure includes a general-purpose computing device 200, including a processing unit (CPU) 220, a system memory 230, and a system bus 210 that couples various system components including the system memory 230 to the processing unit 220. It can be appreciated that the disclosure may operate on a computing device with more than one CPU 220 or on a group or cluster of computing devices networked together to provide greater processing capability. The system bus 210 may be any of several types of bus structures including a memory bus 210 or memory controller, a peripheral bus, and a local bus using any of a variety of bus architectures. The system may also include other memory such as read only memory (ROM) 240 and random access memory (RAM) 250. A basic input/output (BIOS), containing the basic routine that helps to transfer information between elements within the computing device 200, such as during start-up, is typically stored in ROM 240.

The computing device 200 further includes storage means such as a hard disk drive 260, a magnetic disk drive, an optical disk drive, tape drive or the like. The storage device 260 is connected to the system bus 210 by a drive interface. The drives and the associated computer readable media provide nonvolatile storage of computer readable instructions, data structures, program modules and other data for the computing device 200. The basic components are known to those of skill in the art and appropriate variations are contemplated depending on the type of device, such as whether the device is a small, handheld computing device, a desktop computer, or a computer server.

To enable user interaction with the computing device 200, an input device 270 represents any number of input mechanisms, such as a microphone for speech, a touch-sensitive screen for gesture or graphical input, keyboard, mouse, motion detection input, natural language speech interaction and so forth. The device output 280 can also be one or more of a number of output means. In some instances, multimodal systems enable a user to provide multiple types of input to communicate with the computing device 200. The communications interface 290 generally governs and manages the user input and system output.

Figure 1B:
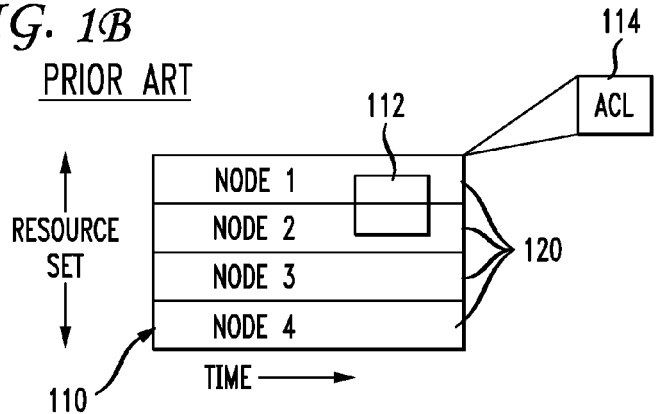
FIG. 1B illustrates a job submitted to a resource set in a computing environment.

Prior to discussing the other aspects of the disclosure, some other explanatory information is provided about reservations and the access control list shown in FIG. 1B. The ACL for reservations may have a dynamic aspect or may be based on who the requester is. The ACL decision making process is based at least in part on the current level of service or response time that is being delivered to the requester. To illustrate the operation of the ACL, assume that a user submits a job and that the ACL reports that the only jobs that can access these resources are those that have a queue time that currently exceeds two hours. The ACL will also have information about the credentials and constraints for that user, such as this is a user in a group that is only allowed to access the compute environment after 5 μm, or is limited to 64 processors and 2 GB of memory. If the job has sat in the queue for two hours it will then access the additional resources to prevent the queue time for the user from increasing significantly beyond this time frame. The decision to allocate these additional resources can be keyed off of utilization of an expansion factor and other performance metrics of the job.

In some cases, a local environment 304 may have configuration files or configuration information that may conflict with exported identity information from an identity manager 302. There are precedent rules that can manage conflicts between local information and exported information. For example, one version of the disclosure may have more credentials for a user or a group. Based on the precedent rules or other conflict rules, one version of the data (local or exported) may have priority over the other version of the data. The conflict rules may therefore resolve in favor of either direction. The IDM may also include credential relationship information such as relationships between groups, users, accounts, and so forth.

Whether or not an ACL is satisfied is typically and preferably determined by the scheduler 104A. There is no restriction regarding where or on what node in the network the process of making these allocation of resource decisions occurs. The scheduler 104A is able to monitor all aspects of the request by looking at the current job inside the queue, the user credentials, and how long it has sat there and what the response time target is and the scheduler itself determines whether all requirements of the ACL are satisfied. If requirements are satisfied, it releases the resources that are available to the job. A job in the queue can then consume resources and the scheduler communicates this to the scheduler 104A. If resources are allocated, the job is taken from the queue and inserted into the reservation in the cluster or compute environment.

An example benefit of this model is that it makes it significantly easier for a site to balance or provide guaranteed levels of service or constant levels of service for key players or the general populace. Important users (users with less constraints and more access to the compute environment) and the general populace may include local users or users that have workload that is sent to the compute environment as overflow.

Figure 3:
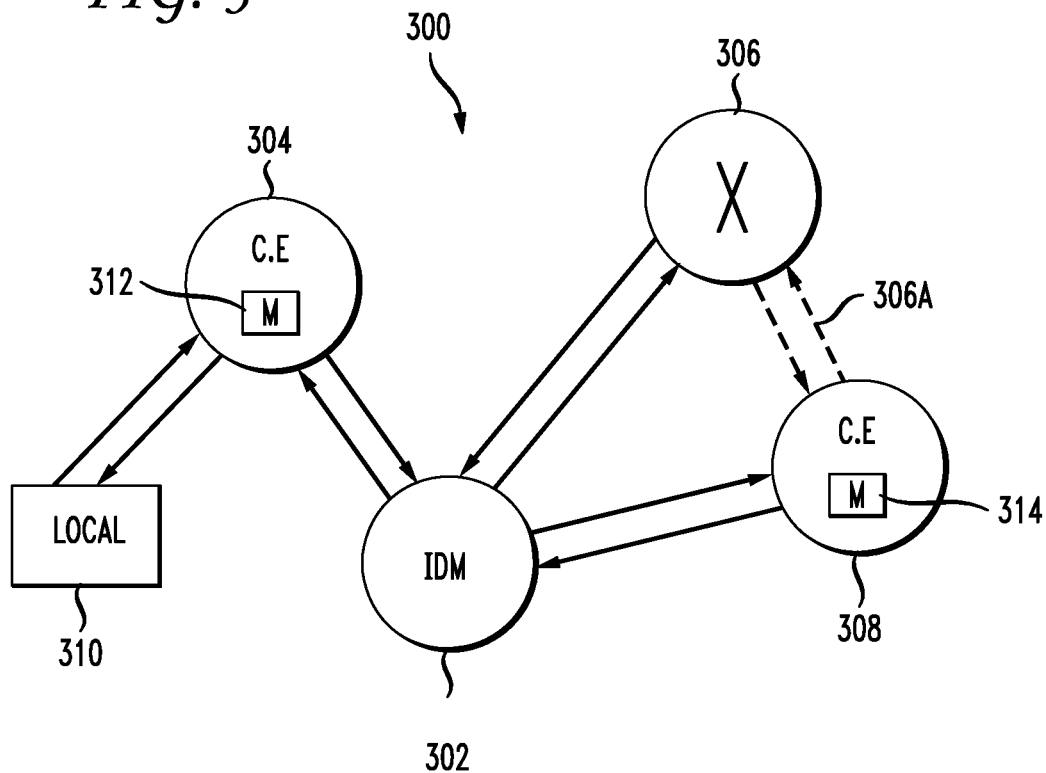
FIG. 3 illustrates an exemplary compute environment associated with the disclosure.

Having discussed the ACL and its role in controlling access to the compute environment, next the context of the present disclosure is discussed with reference to FIG. 3. The network 300 shown in FIG. 3 illustrates an example of the interaction between an identity manager (IDM) 302 and at least one compute environment (C.E.) 304 having management software (M) 312. Computer environment 308 is shown with management software (M) 314. An example of the management software is Cluster Resources' Moab Workload Manager™ and Moab scheduler™. The workload manager and scheduler software or module will control and manage access to and use of the local compute environment 304. The IDM 302 is external to the compute environment 304 and provides for a centralized coordination of identity information. Examples of the types of identity information that may be stored and managed by the IDM 302 include, but is not limited to, information associated with: users, groups, accounts (or projects), qualities of service, classes, contact information for users (such as email, address, phone number, etc), credential types, attributes of the credential types, resource access information, credential relationship information (such as relationships between one credential and another, default credential information, access lists), priorities, fairshare targets, service guarantees, deadlines, service access, resource constraints, billing information such as charge rates, balances, etc., global utilization information, and so forth. The IDM 302 information may be static or dynamic. Any type of identity information for a user or a group or any entity may be gathered by and reside in the IDM 302. The IDM 302 may be a service and may operate with software such as the Oracle® database software.

The IDM 302 may have information associated with at least one of default credential associations and credential specification constraints. The default credential associations define credentials for users where no specified constraints exist and credential specification constraints further include constraints related to at least one of: a service level agreement, priority information, usage limit information, fairshare targets, service guarantees, resource constraints, usage statistics, contact information and billing information.

There are several benefits to having a centralized location for identity information is that where there are a number of compute environments (304, 308), each with local management modules (such as 312, 314). For example, centralized management of identity information provides for dynamic control of the identity information that is accessible to all local workload management and scheduling models. There is the ability to integrate the IDM 302 with other external systems 306 (represented with a generic "X"). For example, the Internet may provide a means for users to input and/or modify identity information that can be transmitted and stored via the IDM 302. Other sources from the Internet or network may also be sources of data for the IDM such as a company internal database of users. Furthermore, with an IDM 302 there is no need to maintain replicated databases at each local site.

The IDM 302 will communicate data to compute environments 304, 308 and receive data from the compute environments 304, 308. For example, local information 310 based on local utilization of resources, local identity information that is identified, and so forth may be obtained by the local workload manager 312 and forwarded to the IDM 302. As an example, while running a job, the local workload manager 312 may obtain a new listing or an updated listing of the contact information, credential and access information for the users in a local group such as a science department. The workload manager 312 may then forward that information about the local group to the IDM 302. In that case, if workload from that local group needs to overflow from compute environment 304 to compute environment 308, that identity information is already contained in IDM 302 and accessible such that those constraints will be maintained for that workload that consumes resources in compute environment 308.

Only a portion of the IDM 302 information may be accessed by any local compute environment 304, 308. In order words, perhaps only the information that pertains to the local environment will be received by the environment 304, 308. The local workload management and scheduling module will utilize the IDM 302 information as well as any local configuration information and identity information if necessary to obtain a global view based on all the available information. The global view includes all the local and non-local information necessary to manage the local resources. For example, with the identity information of non-local users that have access to the local compute environment to process overflow workload, the local manager can obtain the global view of users and possible users that may access the environment.

The workload manager and scheduling module 312 associated with a local environment 304 may continuously exchange information with the IDM 302 in various ways. For example, the local environment may forward information as it obtains it or periodically transmit new information and new records to the IDM 302. The interface is a generalized interface between the local environment and the IDM 302. For example, the information may be communicated by a generic interface such as standard script-based reporting, web-related or web service protocols, SQL supported protocols or any generalized means of communicating this data as would be understood by those of skill in the art.

Returning to FIG. 3, the feature 306 may also refer to another IDM 306. An aspect of this disclosure is that through utilizing the generalized communication protocol between an IDM and a local compute environment, one or more IDMs can communicate with one or more computing environments. Each IDM may store and/or manage a different type of information. There is no specific requirement that there be a single IDM. In this scenario, various groupings or virtual networks or groups of compute resources may be identified for various reasons, such as to process a specific job or workload request. For example, an administrative grouping of the IDM 302, the compute environment 304 and local resources 310 may be defined, reserved, and consumed for a particular purpose.

Similarly, a virtual environment including IDM 306 and compute environment 308 communicating 306A with each other regarding identity information may be established for a particular purpose as well. Providing one or more IDMs communication with one or more compute environments each compute environment operating with workload management and scheduling modules such as MOAB™ provides an increased amount of flexibility and sharing and distribution of workload across a complex and grouping of compute environments.

The global view referenced above for any compute environment is obtained by gathering and processing all available data which includes local data on users, groups, etc. and the exported IDM 302 data, whether it is all the exported and available data at the IDM 302 or only the portion relevant to the respective compute environment 304. This global or holistic view enables the compute environment 304 (perhaps more specifically the workload manager and scheduler module associated with the environment) to understand both the local needs but also external needs that may consume local resources.

Figure 4:
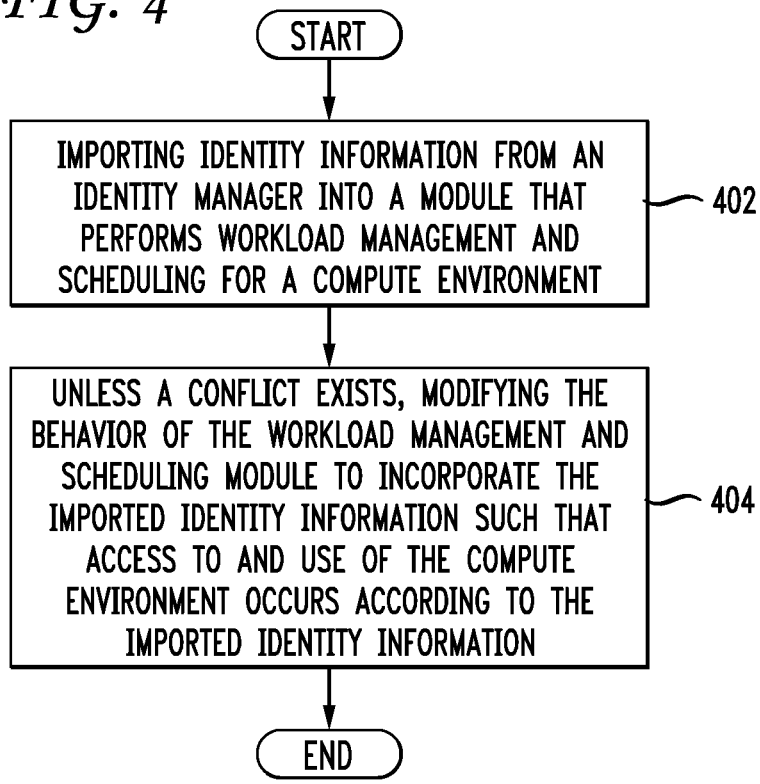
FIG. 4 illustrates a method of managing a compute environment.

FIG. 4 illustrates a method embodiment of the disclosure. The method is preferably practiced by a workload management and scheduling software module associated with a compute environment. The method may be practiced by any computing device or group of computing devices. The method of managing a compute environment method includes importing identity information from an identity manager into a module that performs workload management and scheduling for a compute environment (402) and, unless a conflict exists, modifying the behavior of the workload management and scheduling module to incorporate the imported identity information such that access to and use of the compute environment occurs according to the imported identity information (404).

The various features discussed herein may be utilized as part of the steps of the method embodiment of the disclosure. There may be multiple IDM's and multiple modules that continuously or periodically import and export identity information.

Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the disclosure are part of the scope of this disclosure. Accordingly, the appended claims and their legal equivalents should only define the disclosure, rather than any specific examples given.

I claim:

1. A method comprising:
   importing identity information from an identity manager into a management module that performs workload management and scheduling, at a first time, of workload for consumption of resources in a multi-server compute environment at a second time, which is later than the first time, wherein the identity information comprises credentials associated with at least one of users, groups of users, accounts, projects, classes, queues and qualities of service; and
   modifying a behavior of the management module to incorporate the identity information such that a scheduling decision for resources in the multi-server compute environment is based at least in part on the identity information, wherein if a conflict exists between the identity information and local information, resolving the conflict.

2. The method of claim 1, wherein the identity manager is at least one of: a text file, a database or a service.

3. The method of claim 1, wherein the management module further comprises at least one of a resource manager, a grid manager, a cluster scheduler and a workload manager.

4. The method of claim 1, wherein importing identity information from the identity manager further comprises importing identity information from a plurality of identity managers.

5. The method of claim 4, wherein each identity manager of the plurality of identity managers has a different type of information.

6. The method of claim 1, wherein the identity manager further comprises information associated with at least one of default credential associations and credential specification constraints.

7. The method of claim 6, wherein the default credential associations define credentials for users where no specified constraints exist and credential specification constraints further comprise constraints related to at least one of: a service level agreement, priority information, usage limit information, fairshare targets, service guarantees, resource constraints, usage statistics, contact information and billing information.

8. The method of claim 1, wherein the identity manager is associated with a service that receives identity information from any location including the management module.

9. The method of claim 8, wherein the identity manager receives identity information from at least one of: the Internet, administrator input, another identity manager, and another management module.

10. The method of claim 1, wherein the management module obtains a global view of users and groups based on the identity information and from locally obtained identity information.

11. The method of claim 1, wherein the identity information from the identity manager into the management module comprises a subset of the identity information in the identity manager which is relevant to the multi-server compute environment managed by the management module.

12. The method of claim 1, further comprising:
exporting from the management module locally obtained identity information to the identity manager.

13. The method of claim 12, wherein exporting the locally obtained identity information further comprises periodically exporting the locally obtained identity information as new identity information is discovered by the management module.

14. The method of claim 1, wherein a plurality of identity managers and a plurality of management modules import and export identity information.

15. The method of claim 1, wherein if the conflict is resolved in favor of the local identity information, then the management module manages access to and use of the multi-server compute environment according to the local identity information.

16. The method of claim 1, wherein the identity manager interfaces with the management module according to a generic interface.

17. A system for managing a compute environment, the system comprising:

a processor; and
a non-transitory computer-readable storage medium storing instructions, which, when executed by the processor, cause the processor to perform operations comprising:
importing identity information from an identity manager into a management module that performs workload management and scheduling, at a first time, of workload for consumption of resources in a multi-server compute environment at a second time, which is later than the first time, wherein the identity information comprises credentials associated with at least one of users, groups of users, accounts, projects, classes, queues and qualities of service; and
modifying a behavior of the management module to incorporate the identity information such that a scheduling decision for resources in the multi-server compute environment is based at least in part on the identity information, wherein if a conflict exists between the identity information and local information, resolving the conflict.

18. A non-transitory computer-readable medium storing instructions which, when executed by processor, cause the processor to perform operations comprising:
importing identity information from an identity manager into a management module that performs workload management and scheduling, at a first time, of workload for consumption of resources in a multi-server compute environment, at a second time, which is later than the first time, wherein the identity information comprises credentials associated with at least one of users, groups of users, accounts, projects, classes, queues and qualities of service; and
modifying a behavior of the management module to incorporate the identity information such that a scheduling decision, at the first time, for resources in the multi-server compute environment is based at least in part on the identity information, wherein if a conflict exists between the identity information and local information, resolving the conflict.

* * * * *